United States Patent

[11] 3,561,653

[72] Inventors Henning Emanuel Eriksson
10 Furumostigen;
Folke Assar Eriksson, 1 D
Fagelsangsvagen, Kalix, Sweden
[21] Appl. No. 776,612
[22] Filed Nov. 18, 1968
[45] Patented Feb. 9, 1971

[54] BAGGAGE RACK FOR AUTOMOBILE TOPS
3 Claims, 9 Drawing Figs.
[52] U.S. Cl. .................................................. 224/42.1
[51] Int. Cl. .................................................. B60r 9/04
[50] Field of Search .......................................... 224/42.1,
29, 42.45, 42.07

[56] References Cited
UNITED STATES PATENTS
3,232,502  1/1966  Kleinbortas .................. 224/42.1(E)X FOREIGN PATENTS
85,424    4/1958  Denmark ..................... 224/42.1E
305,598   7/1955  Switzerland ................. 224/42.01
1,268,891 6/1961  France ....................... 224/42.1

Primary Examiner—Gerald M. Forlenza
Attorney—Richards & Geier

ABSTRACT: A baggage carrier for an automobile top has two elongated bars interconnected by transverse bars and consisting of pivotally interconnected sections, so that the baggage carrier can be folded to form a stack the height of which is substantially three times that of the individual bars. The bars are connected with supports used to fix the baggage carrier upon the top of an automobile. The supports can be swung into a position in which they extend substantially parallel to the transverse bars.

PATENTED FEB 9 1971
3,561,653
SHEET 1 OF 2
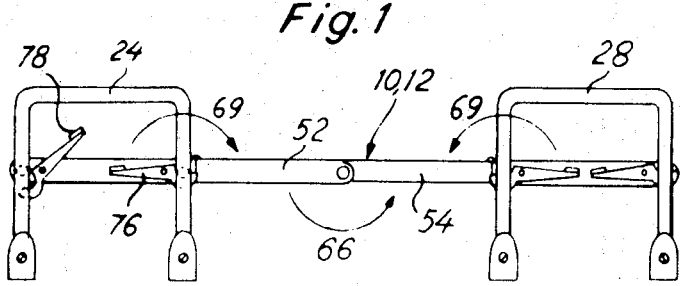
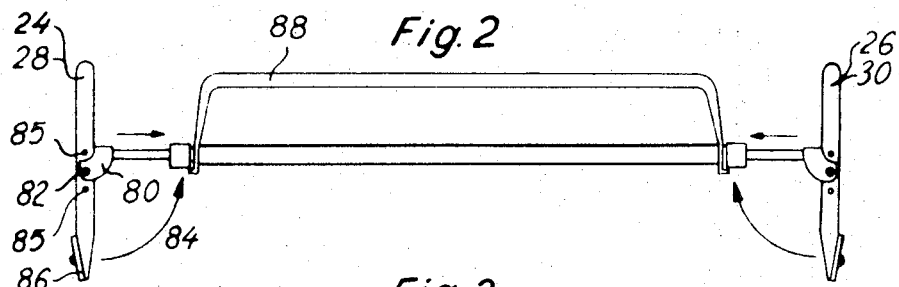
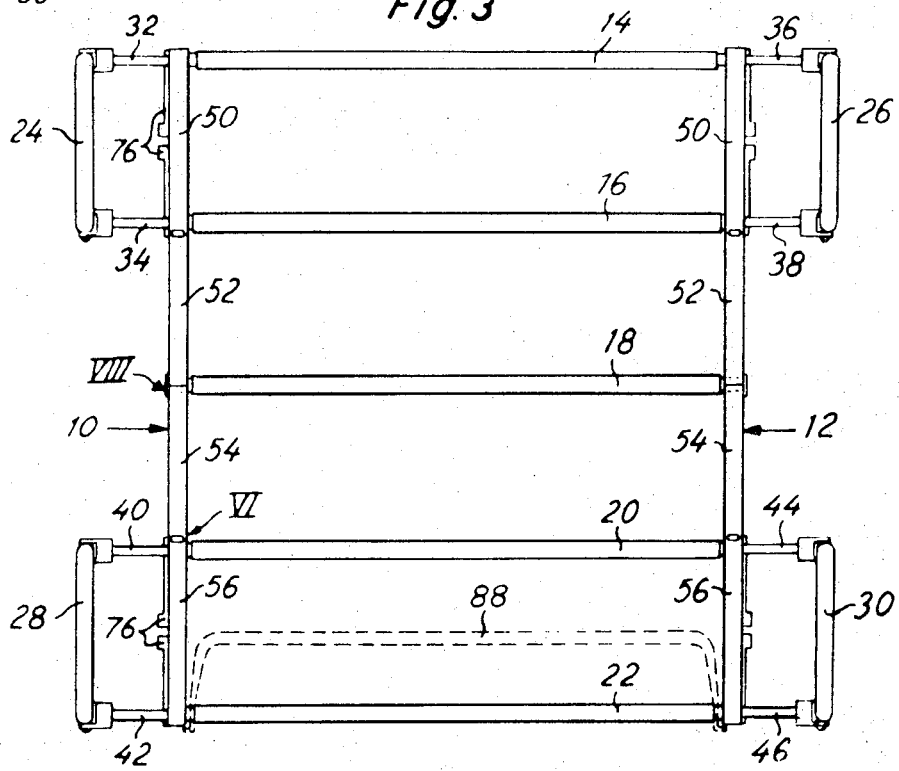
INVENTORS
H. E. ERIKSSON
P. A. ERIKSSON
Richards & Geier
ATTORNEYS

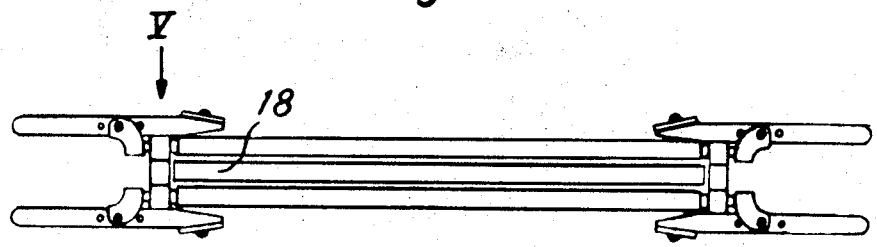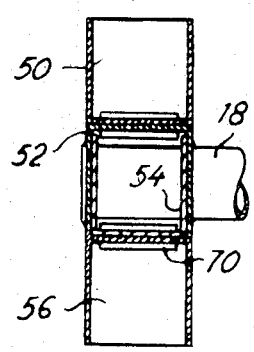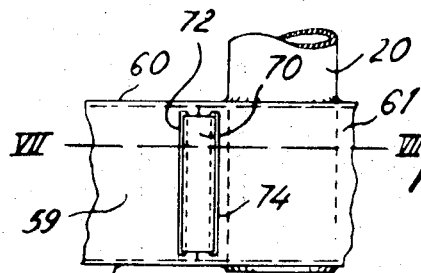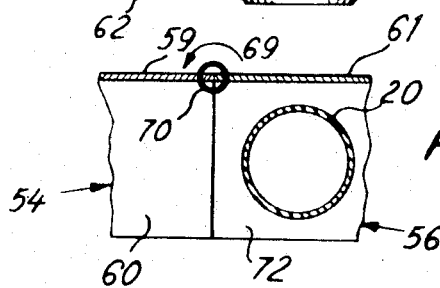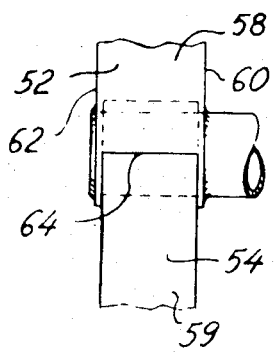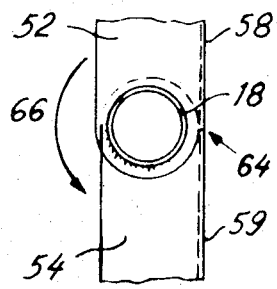

BAGGAGE RACK FOR AUTOMOBILE TOPS

This invention relates to a baggage rack for automobile tops. The invention is particularly concerned with a baggage carrier having two elongated bars which are interconnected by transverse bars and which are provided with supports attaching the baggage carrier to the top of a car.

The problem of adapting a baggage carrier to a specific type of a car has existed for a long time. Up to now it was necessary to make a large number of baggage racks and carriers for the different makes of cars and to keep them in stock. This has greatly increased the costs of baggage carriers, since it was not possible to adequately rationalize their manufacture, namely, to produce them in large series.

An object of the present invention is to eliminate this drawback.

Other objects of the present invention will become apparent in the course of the following specification.

In the accomplishment of the objectives of the present invention it was found desirable to subdivide the elongated bars of a baggage carrier into several pivotally interconnected sections, so that the baggage carrier can be folded to form a stack the height of which is substantially three times that of the individual bars. Supports connected with the bars can be swung into a position in which they extend substantially parallel to transverse bars which joint the elongated bars.

This construction makes it possible to vary the width of the baggage carrier depending upon the make of car upon which the baggage carrier is to be mounted. Furthermore, it is possible to vary the height of the baggage carrier above the attachments of the car top, thereby adapting different heights of the actual car tops above the attachments to different types of cars. Thus the baggage carrier of the present invention can be universally used, so that a single construction is suitable for most of car types in actual use.

The invention will appear more clearly from the following detailed description when taken in connection with the accompanying drawings, showing by way of example only, a preferred embodiment of the inventive idea.

In the drawings:

FIG. 1 is a side view of a baggage rack constructed in accordance with the principles of the present invention.

FIG. 2 is a front view of the baggage rack.

FIG. 3 is a top view of the baggage rack.

FIG. 4 shows the baggage rack after it has been folded.

FIG. 5 is an enlarged section through the baggage rack in the direction of the arrow V of FIG. 4 in a plane which is parallel to that of the drawing.

FIG. 6 shows on a larger scale the part indicated by the numeral VI in FIG. 3.

FIG. 7 is a section along the line VII–VII of FIG. 6.

FIG. 8 shows on a larger scale the part indicated by the numeral VIII in FIG. 3.

FIG. 9 is a side view of the device shown in FIG. 8.

The baggage rack for automobile tops which is shown in the drawings includes a supporting frame having two longitudinal bars 10 and 12 which are interconnected by five transverse bars 14, 16, 18, 20 and 22. The four corners of the frame are provided with four U-shaped supports 24, 26, 28 and 30 which are connected by tubes 32 and 34, 36 and 38, 40 and 42 and 44 and 46, respectively, to the frame.

Each of the bars 10 and 12 is composed of four bar sections 50, 52, 54 and 56 which are pivotally interconnected. As shown in FIGS. 8 and 9, the two central bar sections 52 and 54 have upper flat surfaces 58 and 59, respectively, the outer edges of which are engaged by downwardly extending flat side surfaces 60 and 62. These bar sections are open at the bottom and are pivotally joined. One of the bar sections, for example, the bar section 54 shown in FIG. 8, is somewhat narrower than the other bar section 52, so that it can be inserted into that bar section. The tubular transverse bar 18 passes through the ends of both bar sections and constitutes a pivot for the two bar sections. The upper surfaces 58 and 59 engage each other along their end edges 64, so that the bar sections 52 and 54 can be swung in the direction of the arrow 66 (FIGS. 1 and 9) in a manner similar to that of a pen knife, namely, to the extent of 180°, from the open position shown in FIG. 9 to the folded position shown in FIG. 4; the entire rack is folded in this position.

The bar section 56 is folded upon the bar section 54 by moving its upper surfaces 59 and 61 upon each other in the direction of the arrow 69 (FIG. 7). A hingelike connection between the bar sections 54 and 56 is provided by a sleeve 70 which is inserted into two slits 72 and 74, one of these slits being provided in the surface 59 while the other slit is provided in the surface 61. The transverse bar 20 having the shape of a tube is fixed close to sleeve 70 to the bar section 56, the bar 20 being fixed to the two side surfaces 72 of the bar section 56 and being provided with a coating consisting of a plastic hose. The transverse bar 22 is constructed in the same manner and this is also the case as far as the two transverse bars 14 and 16 are concerned. On the other hand, the transverse bar 18 located in the middle of the frame, which is also provided with a plastic hose, is connected by its ends either in the bar section 52, as shown in FIG. 9, or in the bar section 54.

Obviously it is also possible to provide the tubular transverse bar 18 with end flanges and not attach it at all to the longitudinal bars.

The tubes 32—46 to which the supports 24—30 are attached, are introduced into the transverse bars 14—22 and are movable therein. They are locked in their positions by locking arms 76 which are swingably mounted upon screws in the bar sections and are provided with handles 78. The friction between the locking arms and the bar sections is so adjusted that the arms remain the their locking positions when their front semicircular ends engage the tube being locked.

The outer ends of the tubes 32—46 are provided with U-shaped sheet metal supports 80 having yoke portions connected to the respective tubes and leg portions connected at their front ends with the supports 24—30. The supports 24—30 are swingable about pivot screws 82 fixed in the supports 24—30 and extending through the supports 80. The supports 24—30 are foldable in the direction of arrow 84 from the operative position shown in FIGS. 1 and 2 to the folded position shown in FIG. 4. In order to adapt the height of the baggage carrier above the car top to the respective type of car, each leg of the supports 24—30 is provided with three threaded openings 85, so that the screw 82 may be inserted into one of these openings. The lower ends of the supports 24—30 are provided with the usual holding devices 86 by means of which the supports can be attached to the car top.

Finally, the baggage carrier is provided at its front and rear ends with U-shaped holders 88 which can be folded from the operative position shown in FIG. 2 to a folded position shown by broken lines in FIG. 3. To reach this folded position the holder 88 was swung downwardly between the two transverse bars 20 and 22. The holder 88 cooperates with two stops (not shown) which limit its folding movement and its friction is such that it remains standing in its operative position as well as in its folded position.

An advantage of the described baggage carrier is that, when folded, it does not require much space and that it can be unfolded and placed quickly into its proper place without the use of a tool, with the exception of a screw driver required to adjust the screw 82 and to fix the clamping devices 86 to the roof top. The width and the height of the baggage carrier above the roof top can be adapted to all types of cars. Another advantage from the point of view of operational safety is that the baggage carrier is fixed to the roof top at eight locations.

We claim:

1. A foldable baggage rack for automobile tops, comprising two parallel elongated bars, each of said elongated bars consisting of pivotally interconnected bar sections, tubular transverse bars having ends connected with opposed bar sections, supports, and means swingably connecting said supports with some of said transverse bars and comprising tubes extending into and movable in said transverse bars and pivotal means connecting said supports with said tubes, said bar sections being of equal length and extending one over the other when folded, said supports when folded extending substantially parallel to the transverse bars.

2. A baggage rack in accordance with claim 1, wherein said pivotal means have a plurality of pivotal axes for varying the swinging axis of a support.

3. A baggage rack in accordance with claim 1, wherein each of said supports has a transverse yoke portion and two legs, said yoke portion extending parallel to said elongated bars when the rack is unfolded, said pivotal means connecting the legs of the supports with said tubes, and holding devices carried by the ends of said legs for attaching the rack to an automobile top.